United States Patent
Oyaizu

(10) Patent No.: US 7,461,011 B2
(45) Date of Patent: Dec. 2, 2008

(54) ORDER PLACEMENT AND ACCEPTANCE MANAGEMENT SYSTEM AND METHOD THEREOF

(75) Inventor: Yasushi Oyaizu, Tokyo (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 585 days.

(21) Appl. No.: 10/255,064

(22) Filed: Sep. 26, 2002

(65) Prior Publication Data

US 2003/0088478 A1  May 8, 2003

(30) Foreign Application Priority Data

Sep. 26, 2001  (JP) ............... 2001-293433

(51) Int. Cl.
*G06Q 30/00* (2006.01)
(52) U.S. Cl. .......................... 705/26; 705/37
(58) Field of Classification Search .............. 705/26
See application file for complete search history.

(56) References Cited

U.S. PATENT DOCUMENTS

2002/0147602 A1 * 10/2002 Helms ................ 705/1
2003/0018502 A1 * 1/2003 Rodriguez .............. 705/7

FOREIGN PATENT DOCUMENTS

JP  62-144457  6/1987
JP  2001-092884 A  4/2001

OTHER PUBLICATIONS

Jina, Automated JIT based materials management for lot manufacture, International Journal of Operations & Production Management. Bradford: 1996. vol. 16, Iss. 3; p. 62.*

* cited by examiner

*Primary Examiner*—James Zurita
(74) *Attorney, Agent, or Firm*—Arent Fox LLP

(57) ABSTRACT

An object of the present invention is to provide an order placement and acceptance management system and an order placement and acceptance management method, which is flexible and user-friendly for an order acceptant's side.

The present invention comprises an order database for entirely storing the order data of an orderer in increments of order, demand processing means for receiving the attribution of the order data that is designated by the orderer via a network, retrieving means for receiving the foregoing attribution from the foregoing demand processing means and retrieving a subset of the order data having the foregoing attribution from the foregoing order database, transmission means for transmitting the subset of the foregoing retrieved order data to an order acceptant system via the network and progress managing means for managing the progress of the order in increments of order.

8 Claims, 9 Drawing Sheets

| BUSINESS CONNECTION NO. | FACTORY CODE | DELIVERY DESTINATION | DELIVERY PLACE | PART NUMBER | DATA & TIME | QUANTITY |
|---|---|---|---|---|---|---|
| 1234 | A | S | #080 | 12345-9-0000 | 10/12 09:00 | 100 |
| 1234 | B | S | #220 | 12345-SL5-0000 | 10/15 09:00 | 50 |
| 1234 | A | S | #220 | 12345-MM6-8000 | 10/12 09:00 | 100 |
| 1234 | A | C | #090 | 12345-778-8700 | 10/13 15:00 | 40 |
| 1234 | A | S | #220 | 12345-MN8-0000 | 10/12 09:00 | 50 |
| | | | | | | |

Figure 3

| BUSINESS CONNECTION NO. | FACTORY CODE | DELIVERY DESTINATION | DELIVERY PLACE | PART NUMBER | DATA & TIME | QUANTITY |
|---|---|---|---|---|---|---|
| 1234 | A | S | #080 | 12345-9-0000 | 10/12 09:00 | 100 |
| 1234 | B | S | #220 | 12345-SL5-0000 | 10/15 09:00 | 50 |
| 1234 | A | S | #220 | 12345-MM6-8000 | 10/12 09:00 | 100 |
| 1234 | A | C | #090 | 12345-778-8700 | 10/13 15:00 | 40 |
| 1234 | A | S | #220 | 12345-MN8-0000 | 10/12 09:00 | 50 |
|  |  |  |  |  |  |  |

Figure 4

| | |
|---|---|
| BUSINESS CONNECTION | 1234 |
| FACTORY | A |
| DELIVERY DESTINATION | S |
| DELIVERY PLACE | #220 |
| DATA ISSUED DATE | — |
| PART NUMBER | — |
| DELIVERY DATE | 10/12 09:00 |
| PRINTING/DATA FETCHING IN DATA FORAMT | 128 EBCIDIC |
| PROCESSED | PROCESSED |

Figure 7

| BUSINESS CONNECTION NO. | FACTORY CODE | DELIVERY DESTI-NATION | DELIVERY PLACE | PART NUMBER | DATE AND TIME | QUANTITY | PROCESSED FLAG | DELIVERED FLAG |
|---|---|---|---|---|---|---|---|---|
| 1234 | A | S | #80 | 12345-9-0000 | 10/12 09:00 | 100 | 1 | 0 |

DATA IN INCREMENTS OF ORDER        PROCESSED FLAG    DELIVERED FLAG

ORDER PLACEMENT AND ACCEPTANCE MANAGEMENT SYSTEM AND METHOD THEREOF

BACKGROUND OF THE INVENTION

1. Field of the Invention

The present invention relates to an order placement and acceptance management system and an order placement and acceptance management method, whereby an orderer orders parts or the like from an order acceptant and the order acceptant processes the order and more particularly, the present invention relates to a flexible order placement and acceptance management system and a flexible order placement and acceptance management method, whereby the order acceptant is capable of handling the order in accordance with one's convenience.

2. Description of the Related Art

An orderer, for example, an automobile manufacturer orders various parts from many order acceptants, for example, an auto-part manufacture. In this case, it is necessary for the automobile manufacturer as the orderer to send a order form of parts, on which a content of the order including a part number, a quantity, a delivery place and a delivery date or the like is described, to the automotive parts supplier as the order acceptant. It takes a labor hour to create the above mentioned part order form with respect to various parts, so that, for example, as disclosed in Japanese Patent Application Laid-open No. 62-144457, a method has been employed to send a order form (order slip) for parts to an automotive parts supplier by a network such as a facsimile network or the like.

Alternatively, a system is also employed such that a computer of the automobile manufacturer is connected to a computer of the automotive parts supplier as a trade connection by a wide area network. However, even according to such a system, the automobile manufacturer as the orderer sends the order data to the automotive parts supplier as the trade connection via the network and the automotive parts supplier as the trade connection accumulates this order data in their database, so that the automotive parts supplier as the trade connection has created a required document such as an order form, an identification tag and a statement of delivery or the like on the basis of this order data.

Conventionally, in this way, the order data is transmitted to the automotive parts supplier as the trade connection depending on a convenience of the automobile manufacturer as the orderer and the trade connection receives this data for each time. Therefore, it is inconvenient for the automotive parts supplier that they can pull together the orders only within a range of the data accumulated in one's own database even if they intend to pull together the orders for every attribution of the part such as a kind of the part and the delivery date or the like. Additionally, in the case of widening the range of the data, the database should be increased, so that this involves a disadvantage such that an equipment cost has been higher.

Thus, the conventional order placement and acceptance management system focuses on the orderer, so that, on the order acceptant's part, the conventional order placement and acceptance management system lacks flexibility and freedom and it is not user-friendly.

SUMMARY OF THE INVENTION

So, there is a need to provide an order placement and acceptance management system and an order placement and acceptance management method, which is flexible and user-friendly for an order acceptant's side.

An order placement and acceptance management system according to the present invention comprises an order database for entirely storing the order data of an orderer in increments of order, demand processing means for receiving the attribution of the order data that is designated by an order acceptant via a network, retrieving means for receiving the foregoing attribution from the foregoing demand processing means and retrieving a subset of the order data having the foregoing attribution from the foregoing order database, transmission means for transmitting the subset of the foregoing retrieved order data to an order acceptant system via the network and progress managing means for managing the progress of the order in increments of order.

An order placement and acceptance management method according to the present invention comprises a method for managing the order placement and acceptance by a system including an order database for entirely storing the order data of an orderer in increments of order and this method comprises the steps of receiving the attribution of the order data that is designated by an order acceptant via a network, retrieving a subset of the order data having the foregoing attribution that is designated by the order acceptant, transmitting the subset of the foregoing retrieved order data to an order acceptant system via the network and managing the progress of the order in increments of order.

An order placement and acceptance management program according to the present invention comprises a program for managing the order placement and acceptance by a system including an order database for entirely storing the order data of an orderer in increments of order and this program executes the steps of receiving the attribution of the order data that is designated by the orderer via a network, retrieving a subset of the order data having the foregoing attribution that is designated by the order acceptant, transmitting the subset of the foregoing retrieved order data to an order acceptant system via the network and managing the progress of the order in increments of order.

According to the above described constitutions of the present invention, a subset of the order data having the attribution which is designated by the orderer is retrieved from the order database and this retrieved subset of the order data is transmitted to the order acceptant system, so that, upon receiving the order data, the order acceptant is capable of retrieving the subset of the order data freely by setting the order placement and acceptance management system minutely depending on one's own conveniences. Accordingly, it is possible to provide an order placement and acceptance management system having high flexibility and freedom for the order acceptant. Further, the progress of the order is managed in increments of order, so that the progress information is provided, which is real-time for the orderer and the order acceptant.

According to an aspect of the present invention, a format of the subset of the order data to be transmitted is converted in accordance with the order acceptant. Accordingly, the order acceptant is capable of receiving the data, of which format is converted in accordance with one's own system, so that a load of the order acceptant's system can be decreased.

According to an aspect of the present invention, before receiving the attribution of the order data, which is designated by the order acceptant, authenticates an authentication ID of the order acceptant. Accordingly, the security for exchanging the data via the network is further improved.

According to an aspect of the present invention, upon managing the progress, it is determined that the order acceptant processes the data in increments of order, which is included in the foregoing subset, on the basis of the input from the order acceptant system with regard to the subset of the foregoing retrieved order data. Accordingly, the order acceptant is capable of receiving the subset of the order data at an arbitrary point of time in accordance with one's own conveniences, so that the present system has more flexibility and freedom for the order acceptant.

According to an aspect of the present invention, the data to be transmitted includes the code data of a display code to be printed on a form in order to identify the order data, which is included in the foregoing subset. Accordingly, by using a display code of a form, which is printed by the order acceptant's side, management of the progress by the orderer and the order acceptant becomes easier.

BRIEF DESCRIPTION OF THE DRAWINGS

FIG. 3 shows an example of a constitution of an order database 101;

FIG. 4 shows an example of the attribution of the order data;

FIG. 7 shows a flag for each order unit;

DESCRIPTION OF THE PREFERRED EMBODIMENT

Figure 1:
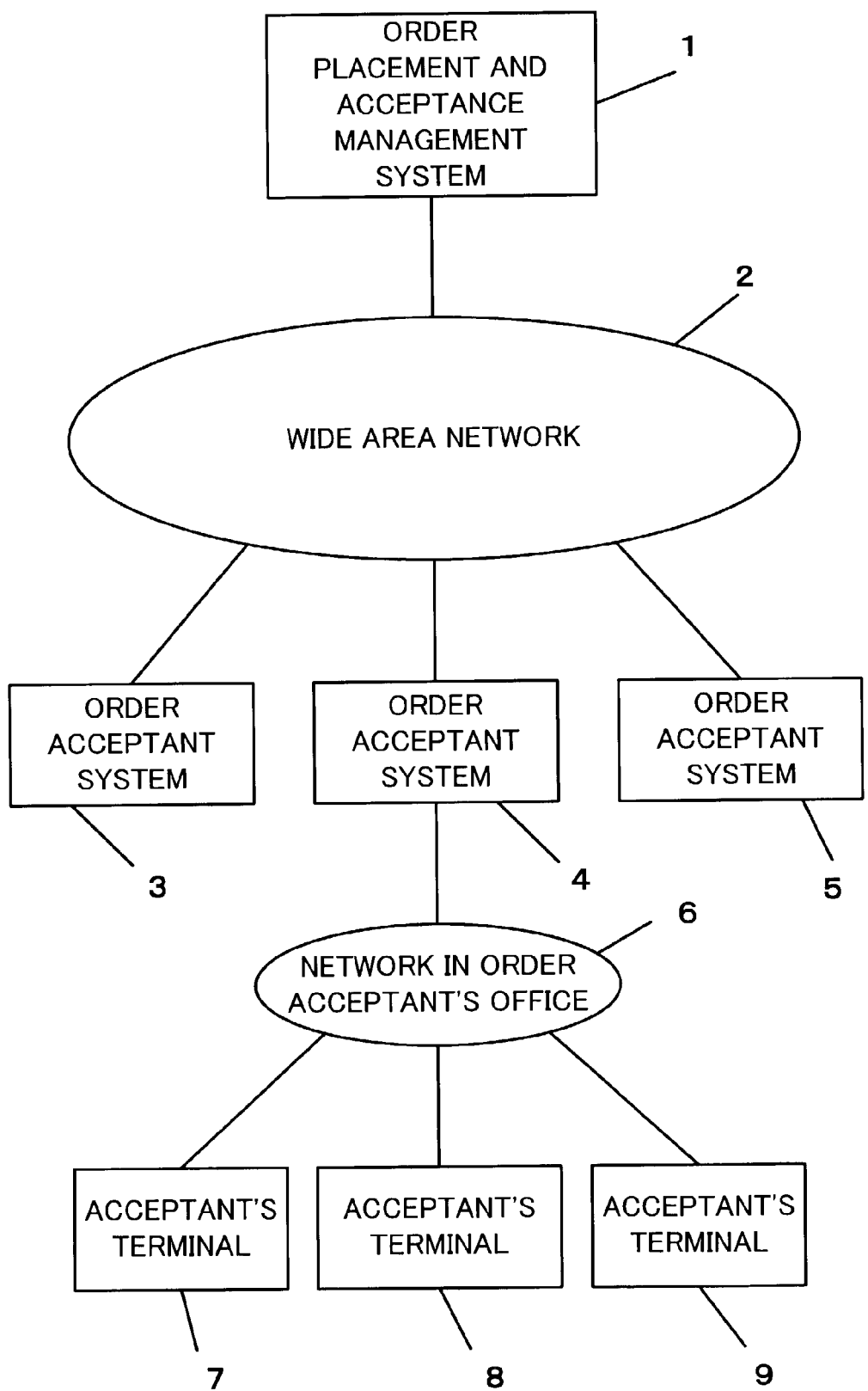
FIG. 1 shows constitutions of an order placement and acceptance management system and an order acceptant system that are connected to a network according to the present invention.

FIG. 1 shows constitutions of an order placement and acceptance management system and an order acceptant system that are connected to a network according to the present invention. In FIG. 1, a reference numeral 1 denotes the order placement and acceptance management system according to the present invention and the order placement and acceptance management system 1 is managed by an orderer. Reference numerals 3 to 5 denote the order acceptant systems and the order acceptant systems 3 to 5 are connected to the order placement and acceptance management system 1 through a network 2.

The network 2 may be a wide area network and it may be realized by using a public communication line or a specific communication line. As the wide area network, a common network for the electric business transaction between business enterprises such as an ANX (Advanced Network Exchange) and a JNX (Japanese Network Exchange) or the like may be used. An object of such a common network is to connect a plurality of order acceptants and a plurality of orderers through a single network and to secure the security and the communication quality as same as those of the dedicated line. In such a common network, a mechanism to secure the security, the capability and the reliability, that is difficult for the Internet to deal with, is incorporated.

Further, a network 6 may be constituted in the order acceptant's office. In this case, terminals 7 to 9 may be set in each factory of the order acceptant.

Figure 2:
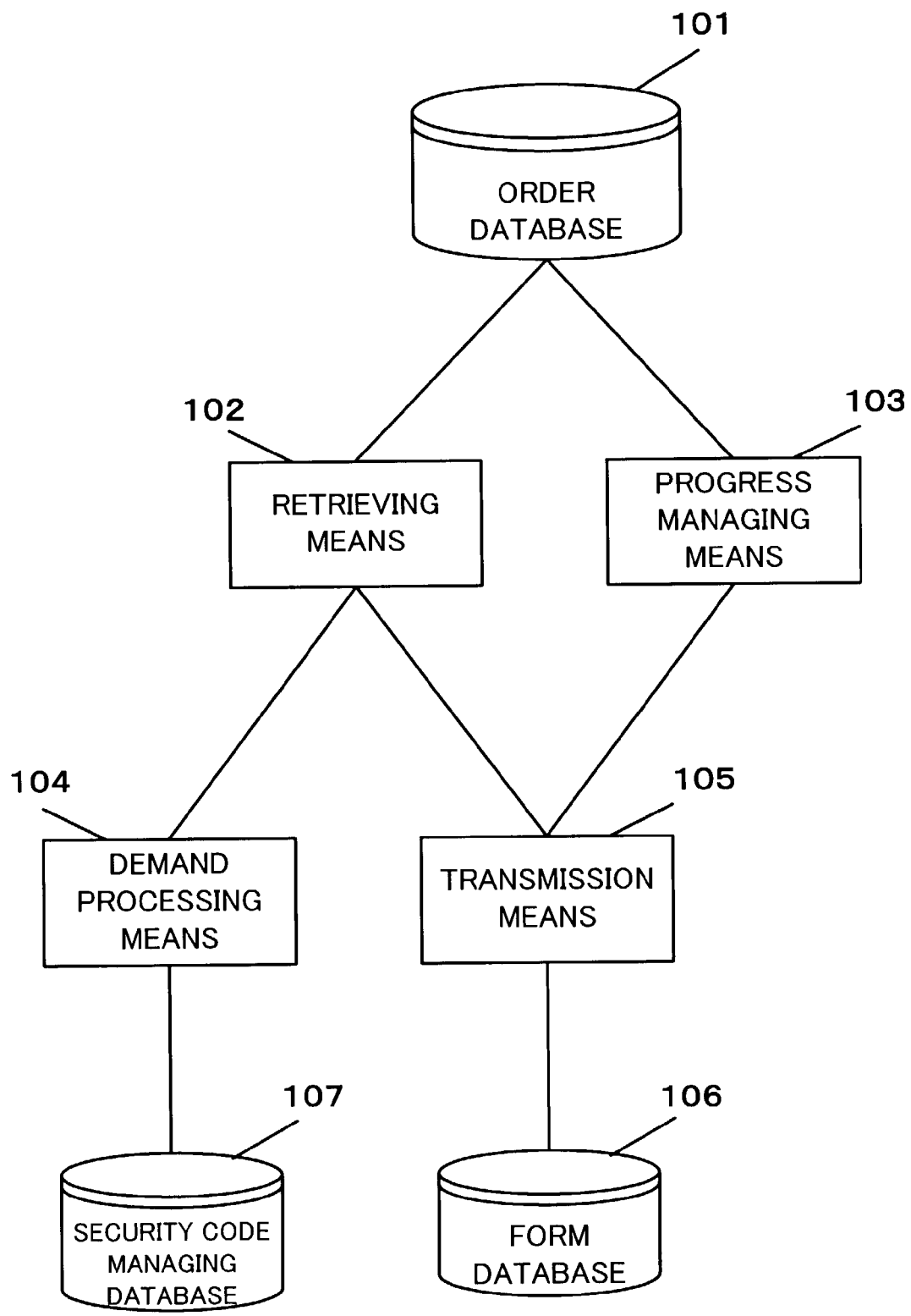
FIG. 2 shows an outline of a constitution of an order placement and acceptance management system according to the present invention.

FIG. 2 shows the outline of a constitution of the order placement and acceptance management system according to the present invention. In FIG. 2, a reference numeral 101 denotes an order database. The order database 101 entirely stores the order data of the orderer in increments of order. The constitution of the order database 101 will be described later.

A reference numeral 102 denotes retrieving means for accessing the above mentioned order database 101 and retrieving the data as being connected to the order database 101. A reference numeral 104 denotes demand processing means that is connected to the order database 101. The order acceptant demands an order data subset satisfying the attribution by designating the attribution of the order data in the order acceptant systems 3 to 5. This demand is transmitted to the demand processing means 104 of the order placement and acceptance management system 1 via the wide area network 2 and the demand processing means 104 transmits this demand to the retrieving means 102. The retrieving means 102 retrieves the subset of the order data having the attribution that is designated by the order acceptant on the basis of this demand from the order database 101. Alternatively, the designation of the attribution of the subset of the order data will be described later in detail.

Figure 8:
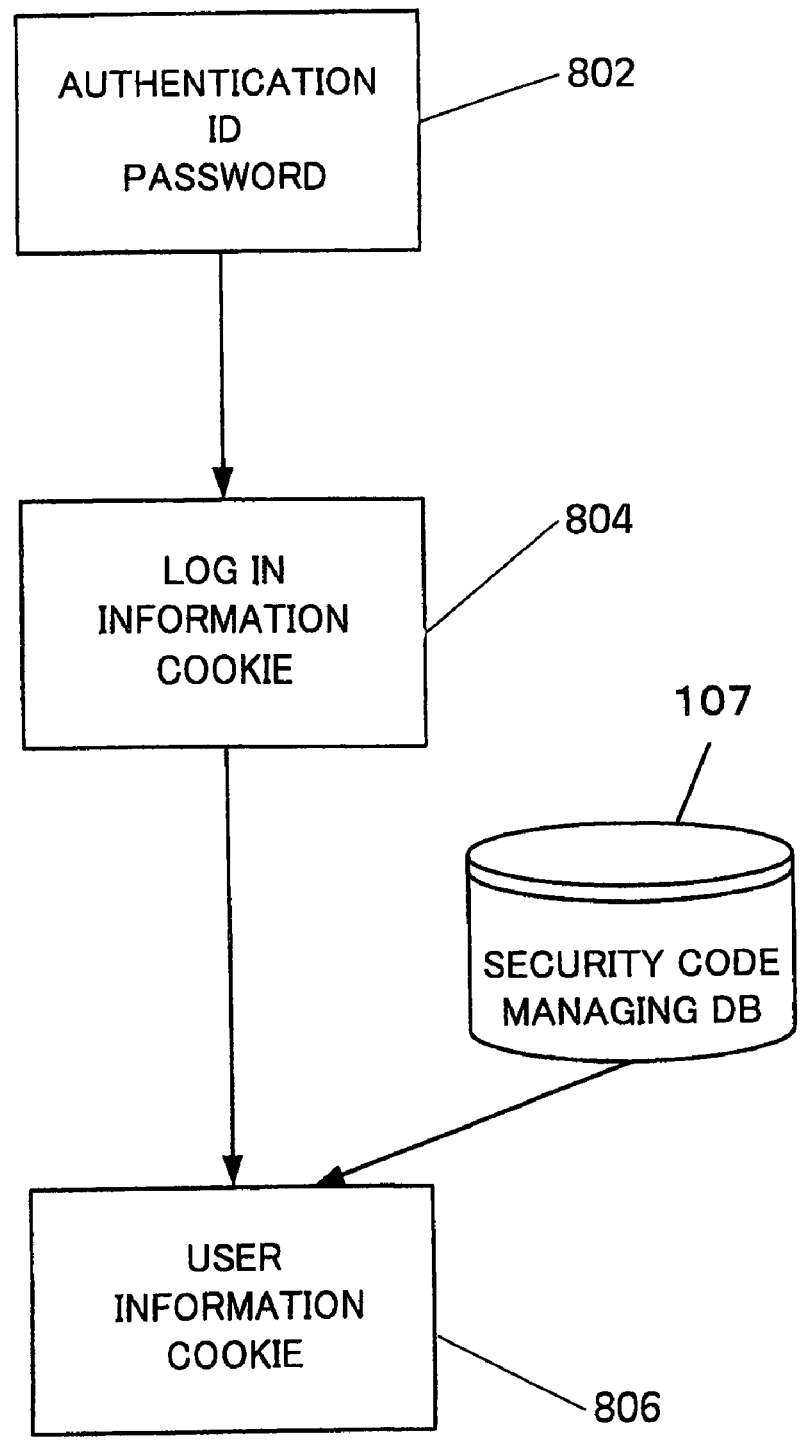
FIG. 8 shows an outline of an authentication function.

The demand processing means 104 may be also provided with a user authentication function. Further, an authentication ID and a password 802 may be provided for each order acceptant as a business connection. FIG. 8 shows the outline of the authentication function. The demand processing means 104 generates log in information cookie 804 by the authentication ID and the password 802 which are inputted from an initial screen of the order acceptant system. Then, when the order acceptant has access to a menu screen of the order acceptant system, the demand processing means 104 generates the user information cookie 806 with reference to a security code managing database 107 (FIG. 2 and FIG. 8). A security code managing database 107 includes an application security code or the like showing to what extent the order acceptant as the user is capable of accessing the information per application and this information is written into the user information cookie 806. According to such a constitution, how to use the order database 101 of the order placement and acceptance management system 1 by the order acceptant as the user is defined.

In FIG. 2, a reference numeral 105 denotes transmission means for transmitting the subset of the order data to the order acceptant systems 3 to 5. The transmission means 105 receives the subset of the retrieved order data from the retrieving means 102 and transmits it to the order acceptant systems 3 to 5. Alternatively, the transmission means 5 converts a format of the subset of the order data to be transmitted in accordance with the order acceptant. Therefore, the transmission means 5 is connected to a form database 106 in which a form is stored.

In FIG. 2, a reference numeral 103 denotes progress managing means for managing the progress of the order. The progress managing means 103 operates in liaison with the transmission means 105 so as to record a result of the progress management in the order database 101.

FIG. 3 shows an example of a constitution of the order database 101. The order database 101 is stored with the order unit as one record. As a data item per order unit, a business connection number showing an order acceptant, a factory code showing a factory of the order acceptant, a delivery destination showing a manufacturing place of the orderer, a delivery place specifying a location in the manufacturing place, a part number, a delivery date and time and a quantity or the like may be considered. The order database 101 is constituted so that it is capable of retrieving these items as a key.

Figure 5:
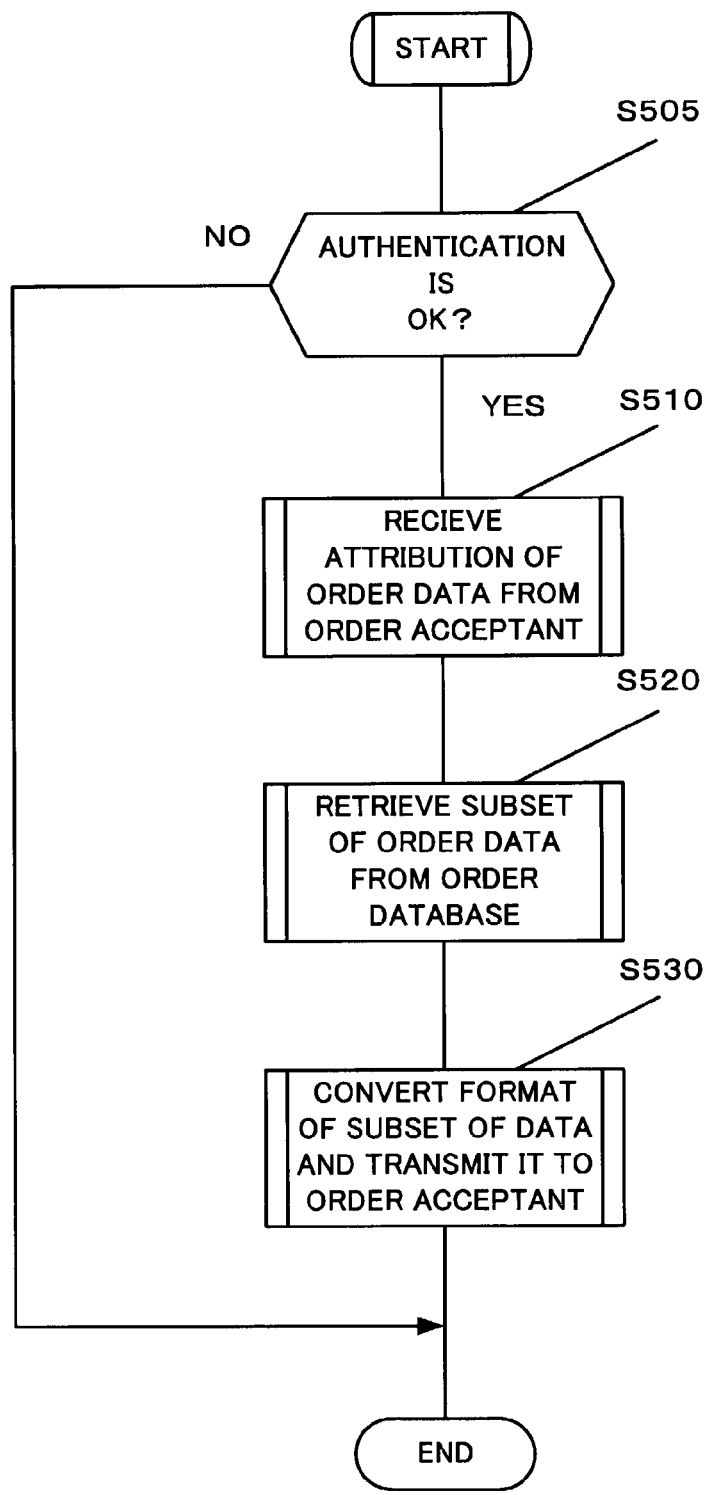
FIG. 5 is a flow chart of the operation of the order placement and acceptance management system according to the present invention.

In the next place, according to a flow chart shown in FIG. 5, the operation of the order placement and acceptance management system according to the present invention will be explained below. In the beginning, in step S505, the demand processing means 104 carries out the above described authentication processing as accessing the security code managing database 107 on the basis of the authentication ID and the password that are transmitted from the order acceptant systems 3 to 5. If the authentication is not carried out normally, the processing will be terminated. If the authentication is carried out normally, the demand processing means 104 proceeds to step S510. In the step S510, the demand processing means 104 receives the attribution of the order data that is designated through the order acceptant systems 3 to 5. The demand processing means 104 delivers the attribution of the received order data to the retrieving means 102.

In step S520, the retrieving means 102 retrieves the subset of the order data from the order database 101 on the basis of the designated attribution. A case of retrieving the subset of the order data from the database constituted as shown in FIG. 3 will be specifically described below.

FIG. 4 shows an example of a designating method of the attribution of the order data. According to this example, the order that the order acceptant of the business connection number 1234 places to an A factory of this order acceptant to be delivered to a delivery place #220 of a S manufacturing place of the orderer in October 12 at nine o'clock is designated. With respect to this designation, the third line and fifth line of records are retrieved from a content of the order database illustrated in FIG. 3 to constitute the subset of the order data. Further, it may be designated that the order acceptant may receive the subset of the order data as the form printing or as the data to be fetched in. Alternatively, a format of the data to be fetched in may be designated. The designation such as the attribution of the above described order data and a format of the data or the like may be performed in such a manner that the order acceptant selects the selection items as displaying them on a screen or the order acceptant inputs the selection items.

In this case, it should be noted that the order acceptant is capable of retrieving the subset of the order data freely owing to one's own circumstances. For example, it is possible to treat the orders of the parts in small quantities as the order in a large quantity by pooling the orders for a period as long as the delivery date allows. As a result, at the factory of the order acceptant, the production lot becomes larger, so that it is possible to improve the working efficiency. Alternatively, upon delivering the parts, it is possible to improve the efficiency of the delivery by putting together the orders, of which delivery places are the same manufacturing places and their delivery dates and delivery times are similar. In this way, a system with freedom and flexibility for the order acceptant is provided. Additionally, it is not required for the order acceptant to provide a database individually in one's own system, so that a load of the system is decreased. Further, in the case of installing more terminals at the order acceptant's side, it is also possible to receive the necessary information in conjunction with the completion of setting the terminal.

In the next place, returning to FIG. 5, in step S520, the retrieving means 102 delivers the subset of the retrieved order data to the transmission means 105. In step S530, the transmission means 105 converts a format of the subset of this order data depending on the order acceptant and transmits it to the order acceptant. Then, the processing of the transmission means 105 will be described in detail with reference to a flow chart shown in FIG. 6 below.

In step S610, the transmission means 105 judges whether or not the subset of the retrieved order data should be converted into the form data. It depends on the order acceptant whether or not the subset of the retrieved order data should be converted into the form data. In the case that the order acceptant uses the data that is processed by one's own system, there is no need to convert the subset of the retrieved order data into the form data. On the contrary, in the case that the order acceptant uses the data only as the form in one's own system, it is preferable to receive the data that has been converted into the form data. As described above, it may be inputted from the order acceptant systems 3 to 5 and transmitted to the order placement and acceptance management system 1 whether or not the subset should be converted into the form data. Alternatively, it may be stored as the fixed data in the order placement and acceptance management system 1 so that the transmission means 105 refers to it.

In the case of converting it into the form data, in step S615, the transmission means 105 converts the subset of the order data into the form data. For example, it may be converted into a PDF (Portable Document Format by Adobe Systems Incorporated).

In the next place, in step S620, the transmission means 105 judges whether or not the subset of the order data to be transmitted to the order acceptant system is defined as processed. In this case, "processed" means that the process of order placement and acceptance has been completed. It is judged whether or not the subset of the order data to be transmitted to the order acceptant system is defined as processed depending on the input from the order acceptant system. The order acceptant, as shown in FIG. 4, whether or not the subset of this order data is defined as processed may be inputted upon demanding the subset of the order data as designating the attribution of the order data. If the subset of this order data is not defined as processed, the transmission means 105 proceeds to step S630.

In the case that it is defined as processed, in step S625, the transmission means 105 defines the subset of the order data to be transmitted as processed for each order unit, namely, for each record. Specifically, the transmission means 105 hoists a processed flag for each order unit shown in FIG. 7 in the order database 101.

In the above case, it should be noted that it is possible to manage the progress minutely for each order unit since the processed flags are managed for each order unit. Alternatively, whether or not the subset has been processed may be included in the attribution of the order data for each order unit. This is more advantageous because, in order to retrieve the subset of the order data, the order acceptant is capable of retrieving the order data that has been processed as designating it together with other attribution upon designating the attribution of the data as shown in FIG. 4.

In the next place, in step S630, the transmission means 105 transmits the subset of the order data to the order acceptant system. Specifically, the subset of the order data may be displayed or printed by activating a display function or a printing function of a browser of the order acceptant system.

In the above case, it should be noted that the subset of the order data is transmitted in various formats in accordance with the demand of the order acceptant. For example, if the system of the order acceptant receives the data in a standard format for printing, a dedicated program and a dedicated printer for printing are not necessary in the order acceptant's system, so that a load of the order acceptant's system is decreased.

Figure 9:
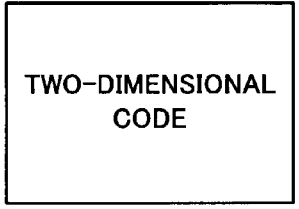
FIG. 9 shows a constitution of a statement of delivery to be printed by the form data.

FIG. 9 shows a constitution of a statement of delivery to be printed by the above mentioned form data. There are two kinds of the statement of delivery. Specifically, one item is described in one statement and many items are described in one statement. One-item-in-one-statement is issued for each order unit. In order to identify the content, a bar code is printed in the one-item-in-one-statement and a two-dimensional code is printed on many-items-in-one-statement. By reading the bar code of the one-item-in-one-statement upon delivery, it is possible to manage the progress for each order unit. Such progress management may be carried out by delivering the data of the order database 101 to other delivery managing system. Alternatively, for the process management, the delivered flag may be used for each order unit shown in FIG. 7.

Figure 6:
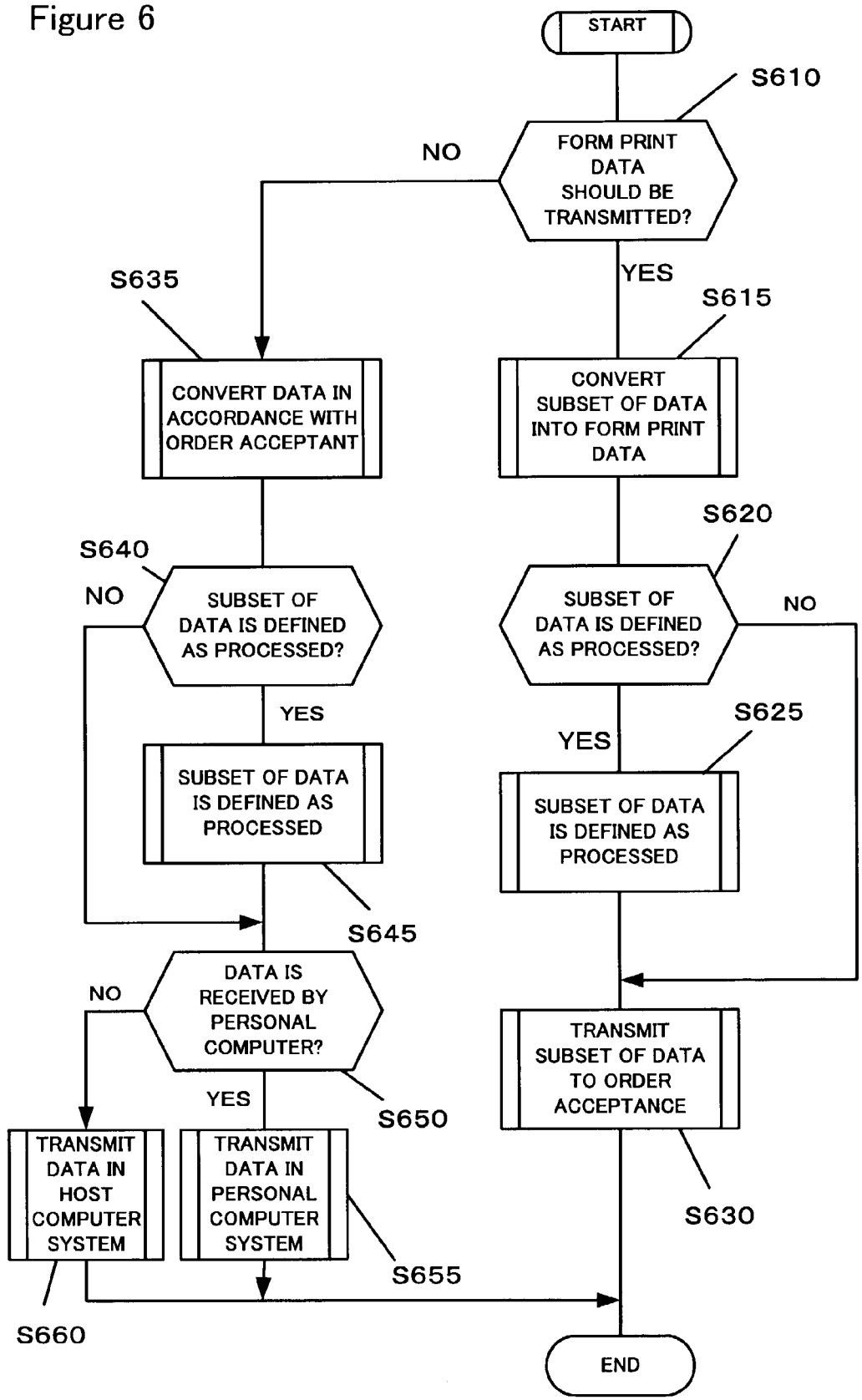
FIG. 6 is a flow chart of the detailed processing of transmission means 105.

In the case that the subset of the order data is not converted into the form data, in step S635 shown in FIG. 6, the appropriate data exchange will be performed in accordance with the orderer. For example, in accordance with the demand of the orderer, it is converted into EBCIDIC of 12 bytes, ASC11 of 128 bytes and UN/EDIFACT or the like. It may be inputted from the order acceptant systems 3 to 5 to be transmitted to the order placement and acceptance management system 1 what code it is converted into with reference to FIG. 4 as explained above. Alternatively, it is stored within the order placement and acceptance management system 1 as the fixed data, so that the transmission means 105 may refer to it.

In the next place, in step S640, the transmission means 105 judges whether or not the subset of the order data to be transmitted to the order acceptant system is defined as processed. In this case, "processed" means that the process of order placement and acceptance has been completed. It is judged whether or not the subset of the order data to be transmitted to the order acceptant system is defined as processed depending on the input from the order acceptant system. The order acceptant, as shown in FIG. 4, it may be inputted whether or not the subset of this order data is defined as processed upon demanding the subset of the order data as designating the attribution of the order data. If the subset of this order data is not defined as processed, the transmission means 105 proceeds to step S650.

In the case that it is defined as processed, in step S645, the transmission means 105 defines the subset of the order data to be transmitted as processed for each order unit, namely, for each record. Specifically, the transmission means 105 hoists a processed flag for each order unit shown in FIG. 7 in the order database 101.

In the above case, it should be noted that it is possible to manage the progress minutely for each order unit since the processed flags are managed for each order unit. Alternatively, it may be included in the attribution of the order data for each order unit whether or not the subset has been processed. This is more advantageous because the order acceptant is capable of retrieving the subset of the order data together with other attribution, for example, the order acceptant is capable of retrieving the subset of the order data as designating the order data that has been processed.

In step S650, the transmission means 105 judges whether or not the order acceptant system receives the data as a personal computer or as a host computer. In the case that the order acceptant system receives the data as a personal computer, in step S655, for example, it transmits the data in a Web system. Specifically, the subset of the order data may be transferred as activating a transfer function of the browser. In the case that the order acceptant system receives the data as a host computer, in step S660, the subset of the order data may be transmitted via an accumulation exchange function (for example, IE/EX by IBM Corporation) by the use of a mailbox.

The order acceptant system receives the subset of the order data in a form to be easily used by one's own system and outputs the form, which is illustrated in FIG. 9 according to need. The constitution of the statement of delivery and the progress management are the same as in the above described case of receiving the form data.

In the above case, it should be noted that the subset of the order data is transmitted in various formats in accordance with the demand of the order acceptant. The order acceptant is capable of selecting a convenient format in accordance with how to use the data in one's own system. Further, since the order placement and acceptance management system performs up to the format conversion, it is possible to decrease the load of the order acceptant system to a large extent.

According to the present invention, upon receiving the order data, the order acceptant is capable of retrieving the subset of the order data freely by setting the order placement and acceptance management system minutely depending on one's own conveniences. For example, it is possible to treat the orders of the parts in small quantities as the order in a large quantity by pooling the orders for a period as long as the delivery date allows. As a result, at the factory of the order acceptant, the production lot becomes larger, so that it is possible to improve the working efficiency. Alternatively, upon delivering the parts, it is possible to improve the efficiency of the delivery by putting together the orders, of which delivery places are the same manufacturing places and their delivery dates and delivery times are similar.

According to an aspect of the present invention, a format of the subset of the order data to be transmitted is converted, so that the order acceptant is capable of selecting a convenient format in accordance with a characteristic of the data in one's own system. Further, since the order placement and acceptance management system performs up to the format conversion, it is possible to decrease the load of the order acceptant system to a large extent.

According to an aspect of the present invention, before receiving the attribution of the order data, which is designated by the order acceptant, the ID of the order acceptant is authenticated, so that the security for exchanging the data via the network is further improved.

According to an aspect of the present invention, upon managing the progress, it is determined that the order acceptant processes the data in increments of order, which is included in the foregoing subset, on the basis of the input from the order acceptant system with regard to the subset of the foregoing retrieved order data. Accordingly, the order acceptant is capable of receiving the subset of the order data at an arbitrary point of time in accordance with one's own conveniences, so that the present system has more flexibility and freedom for the order acceptant.

According to an aspect of the present invention, the data to be transmitted includes the code data of a display code to be printed on a form in order to identify the order data, which is included in the foregoing subset. Accordingly, by using a display code of a form, which is printed by the order acceptant's side, management of the progress by the orderer and the order acceptant becomes easier.

What is claimed is:

1. An order placement and acceptance management system, comprising:

an order database for storing order data, each increment of the order data being stored in a record of the order database;

demand processing means for receiving values of attributes, including a code representing an order acceptant, of the order data in records that are designated by an order acceptant via a network;

retrieving means for receiving the values of attributes from the demand processing means and retrieving a subset of the order data directed to the order acceptant, including at least one increment of the order data from the order database, the subset being determined at the request of the order acceptant, said subset having the values of attributes;

transmission means for transmitting the subset of the retrieved order data to an order acceptant system via the network; and progress managing means for managing the progress of the order, where the progress managing means determines that the subset of the order data is defined as processed, on the basis of an input from the order acceptant system with regard to the subset of the received order data.

2. An order placement and acceptance management system according to claim 1, wherein the transmission means reformats the subset of the order data to be transmitted in accordance with the demands of the order acceptant.

3. An order placement and acceptance management system according to claim 1 or claim 2, wherein the demand processing means authenticates an authentication ID of the order acceptant.

4. An order placement and acceptance management system according to claim 1 or claim 2, wherein the data to be transmitted by the transmission means includes the code data of a display code to be printed on a form for identifying the order data, which is included in the subset.

5. An order placement and acceptance management method for managing the order placement and acceptance by a system including an order database for storing the order data, each increment of the order data being stored in a record of the database, comprising:

receiving values of attributes, including a code representing an order acceptant, of the order data in records that are designated by the order acceptant via a network;

retrieving a subset of the order data directed to the order acceptant including at least one increment of the order data, from the order database, the subset being determined, at the request of the order acceptant, said subset having the received values of attributes;

transmitting the subset of the retrieved order data to an order acceptant system via the network; and managing the progress of the order where managing the process of the order comprises that the subset of the order data is defined as processed, on the basis of an input from the order acceptant system with regard to the subset of the order data.

6. An order placement and acceptance management method according to claim 5, wherein the transmitting step reformats the subset of the order data to be transmitted in accordance with the order acceptant.

7. An order placement and acceptance management method according to claim 5 or claim 6, comprising the step of authenticating an authentication ID of the order acceptant before the receiving step.

8. An order placement and acceptance management method according to claim 5 or claim 6, the data to be transmitted by the transmission step includes the code data of a display code to be printed on a form in order to identify the order data, which is included in the subset.

* * * * *